INVENTORS
VIRGIL F. BOZEMAN
HOWARD F. CLAUSEN
ATTORNEYS

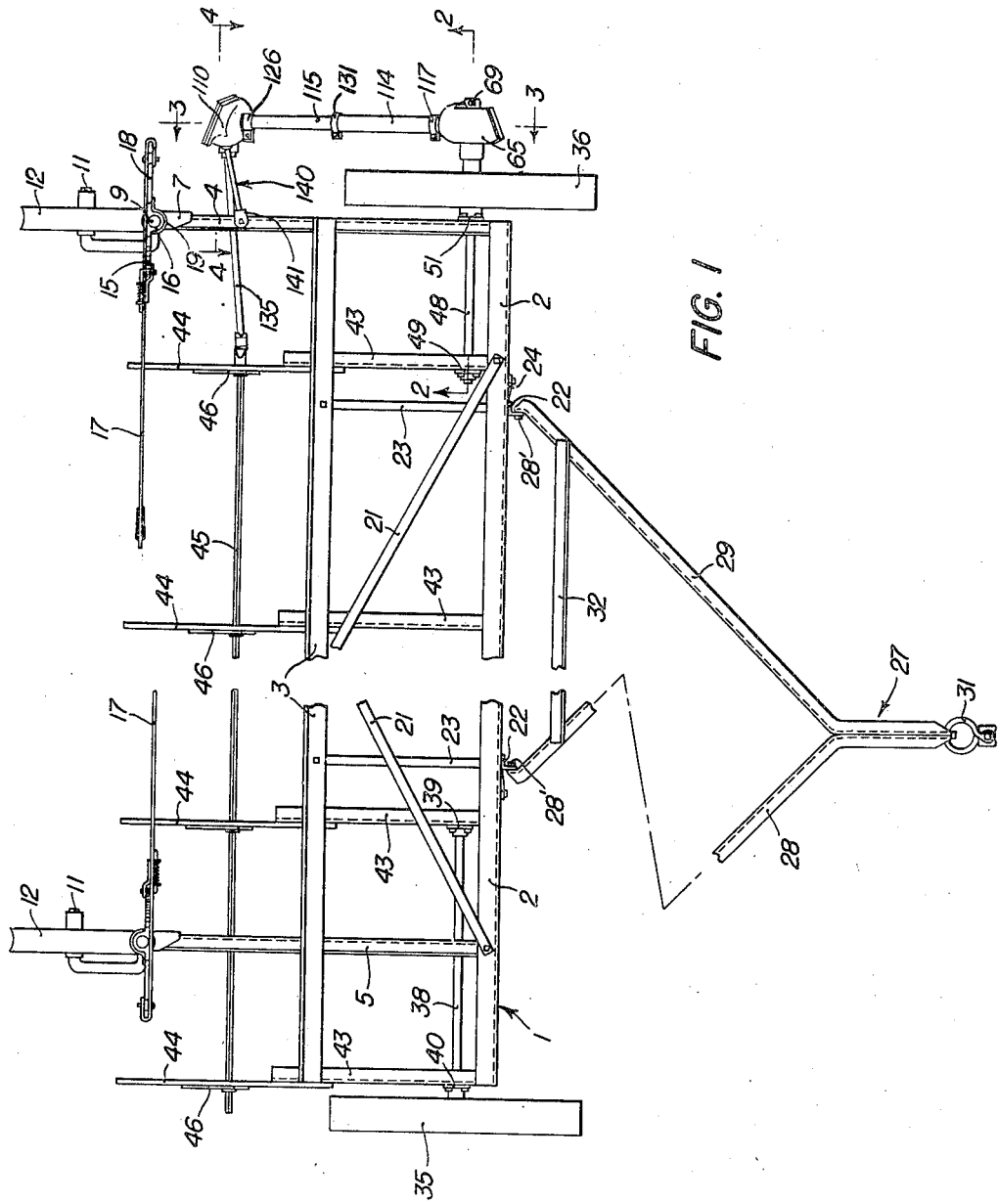

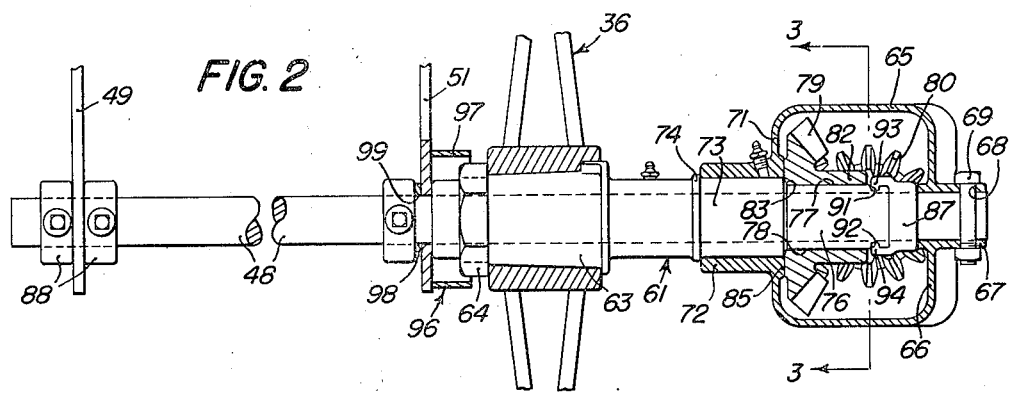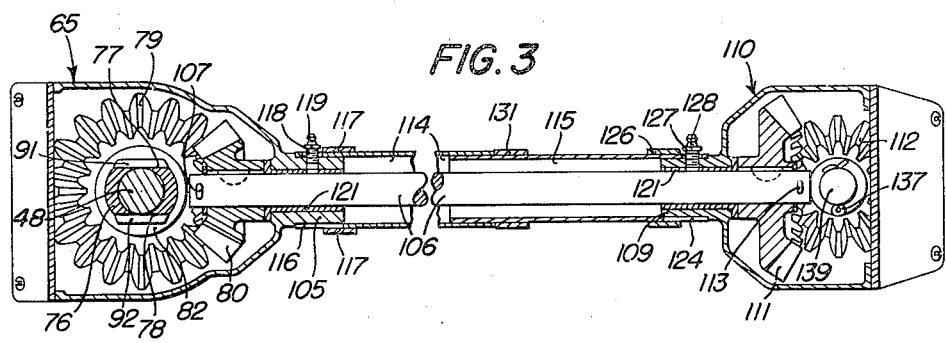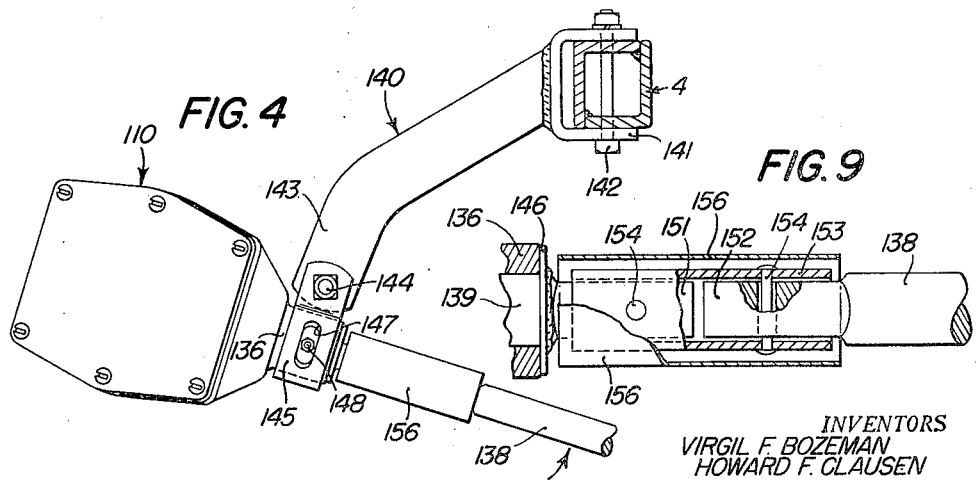

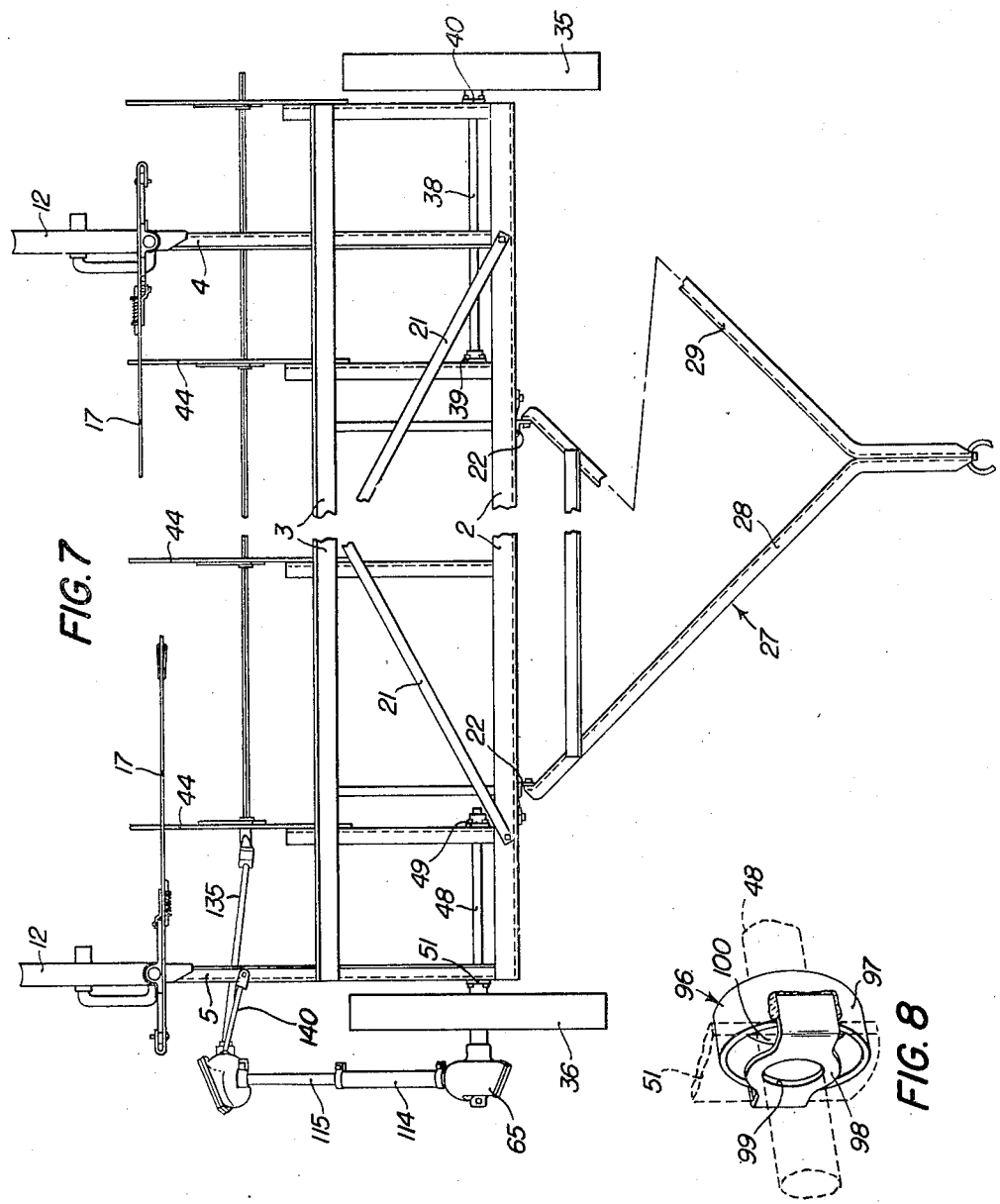

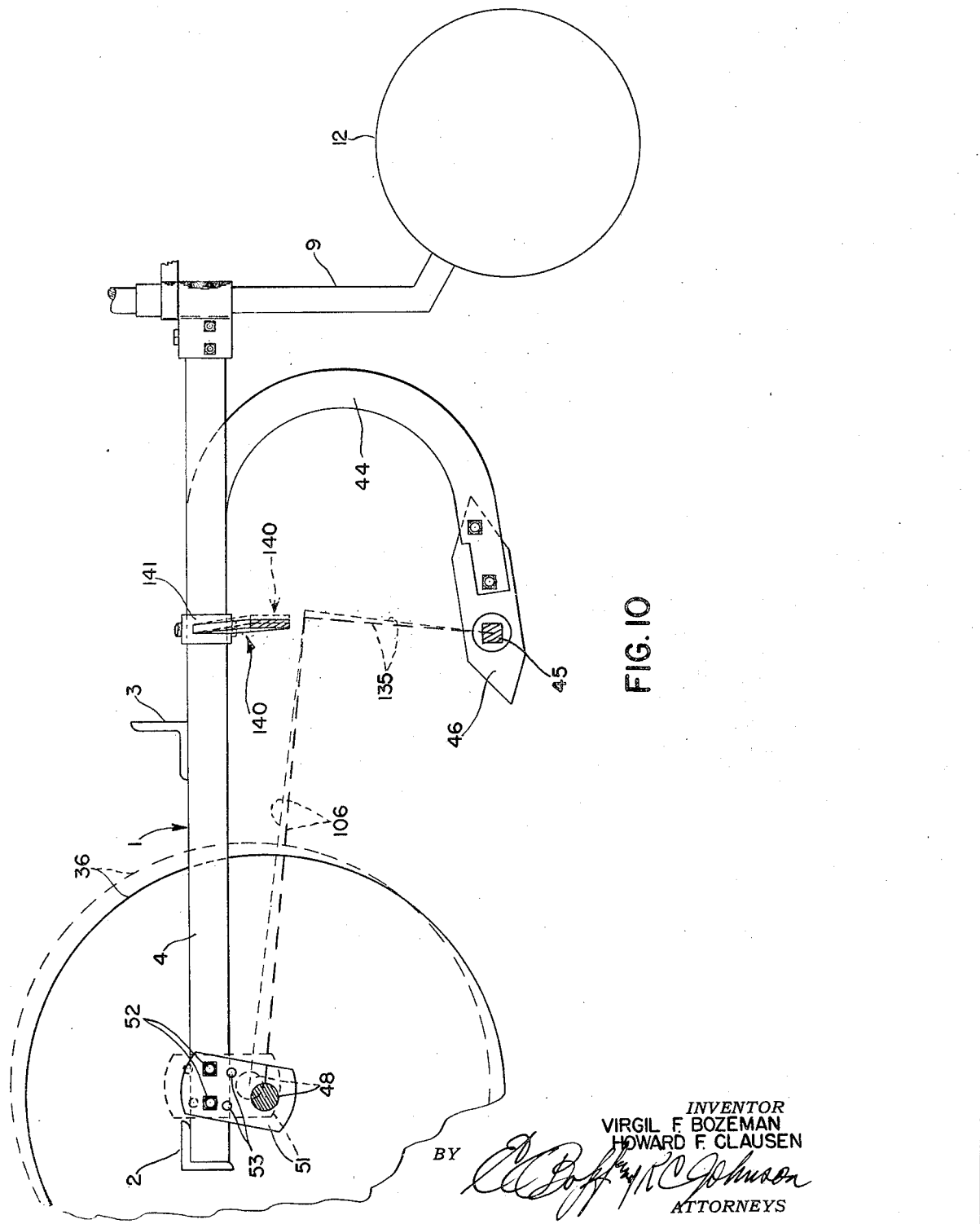

Patented Nov. 15, 1949

2,488,265

UNITED STATES PATENT OFFICE 2,488,265

DRIVE MEANS FOR ROTARY ROD WEEDERS

Virgil F. Bozeman and Howard F. Clausen, Moline, Ill., assignors to Deere & Company, Moline, Ill., a corporation of Illinois Application December 2, 1944, Serial No. 566,297

21 Claims. (Cl. 97—42)

1

The present invention relates generally to rod weeders and other agricultural implements and is more particularly concerned with new and improved driving connections from a ground wheel of the rod weeder to the rotary rod thereof. More specifically, it is a feature of this invention to provide driving means that is practically entirely enclosed and has no projecting parts and the like that are apt to gather trash and the like. Further, it is a feature of this invention to provide a weeder rod drive that includes a pair of enclosed bevel gear units and associated shaft means whereby the use of exposed chains and other moving parts is entirely eliminated.

Another feature of the present invention is the provision of an improved weeder rod drive which not only provides exceptionally good clearance but, in addition, may readily be adjusted, during manufacture or otherwise, to accommodate different positions of the weeder rod with respect to the rod weeder frame, and another feature of the present invention is the provision of driving connections which may readily be moved from one side of the rod weeder to the other, as may sometimes be desirable in case a farmer desires to hitch two rod weeders together, in which case it is preferable to have one driven from the right side and the other driven from the left side so that there is no strip of ground unworked between the two implements.

These and other objects and advantages of the present invention will be apparent to those skilled in the art after a consideration of the following detailed description, taken in conjunction with the accompanying drawings in which the preferred form of the invention has been illustrated.

In the drawings:

Figure 1 is a plan view of a rod weeder in which the principles of the present invention have been incorporated.

Figure 2 is a section taken generally along the line 2—2 of Figure 1, showing the drive from the ground wheel to the first gear box.

Figure 3 is a side view, taken generally along the line 3—3 of Figure 1.

Figure 4 is a detail view, showing the rocking connection between the rear gear box and its support on the rod weeder frame, Figure 4 being a view taken generally along the line 4—4 of Figure 1.

Figure 5:
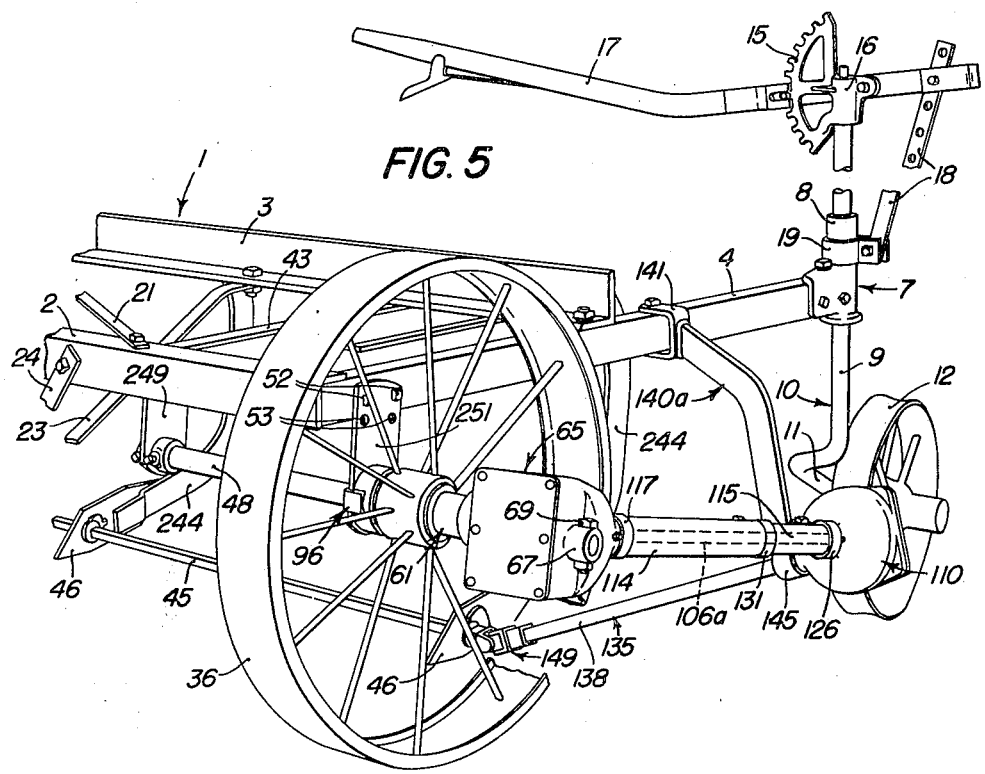
Figures 5 and 6 are side views showing the manner in which the driving connections of the present invention accommodate different positions of the weeder rod, either in a high position

2 or in a low position, with respect to the rod weeder frame.

Figure 7 is a view similar to Figure 1 and shows an optional arrangement of the driving connections.

Figure 8 is a fragmentary perspective view showing the dust collar for the driving wheel.

Figure 9 is a detailed view showing the misalignment accommodating means incorporated in the drive from the rear gear box to the weeder rod.

Figure 10 is a diagrammatic view illustrating the two positions of the hanger brackets on the frame of the weeder.

Referring now to the drawings, particularly Figures 1 and 3, the frame 1 of the rod weeder comprises a front angle 2 and a rear angle 3 extending transversely of the machine and connected together at their ends by right and left end bars 4 and 5. Preferably, each of the end bars is made up of a pair of angles welded together along their contacting edges to form a box beam, and each end bar is extended rearwardly a considerable distance back of the rear frame angle 3 and at its end receives a spindle casting 7, each of which is provided with a vertical sleeve section 8 forming a bearing in which the vertical spindle section 9 of a wheel standard 10 is disposed. The lower end of the latter member is bent so as to form a wheel receiving section 11 on which a transport wheel 12 is journaled for rotation, the standard 10 being so formed that the wheel 12 casters. A hand lever rack 15, having a cap section 16 receiving the upper end of the spindle 9, is mounted on each of the wheel standards 10 and has pivoted thereto a hand lever 17, the end of which is connected by a link 18 to an anchoring clip 19 which encircles an upper portion of the associated casting 7 and is rotatable with respect thereto but restrained against displacement in a vertical direction. Each hand lever 17 may face in any desired direction since the assembly may pivot on the spindle section 9. Swinging the hand levers 17 into different vertical positions serves to raise or lower the rear portion of the frame 1 with respect to the rear transport wheels 12.

The frame 1 is reenforced by a plurality of cross braces 21, and a pair of depending hitch angles 22 is bolted to the forward face of the front angle 2, the hitch angles 22 being reenforced by a pair of rearwardly extending braces 23 and a pair of laterally upwardly extending braces 24 bolted to the front and rear frame angles as shown in Figures 1 and 5. A hitch frame 27 is pivoted, as at 28', to any one of a series of openings formed in the hitch angles 22 and comprises a pair of rearwardly diverging angles 28 and 29 connected together at their forward ends and apertured to receive a clevis 31 that may be attached to a tractor or the like for propelling the implement. The rear portions of the angles 28 and 29 are reenforced by a cross brace 32. The frame 1 is supported on a pair of ground wheels 35 and 36 and the transport wheels 12 mentioned above. The ground wheel 35 (Figure 1) is mounted for rotation on the outer end of an axle 38 that is connected with the frame 1 by laterally inner and outer hanger brackets 39 and 40. Also forming a part of the frame is a plurality of pendant beams 43, each of which is bolted both to the front and rear frame angles 2 and 3, respectively, and each beam at its rear end is formed with a downwardly and forwardly extending pendant section 44 in which a weeder rod 45 is journaled for rotation, as by means of conventional weeder rod bearing shoe units 46. The hanger 40 referred to above is bolted to the pendant beam 43 that is fixed to the right ends of the frame angles 2 and 3, as shown in Figure 1.

The other ground wheel 36, constitutes the driving wheel and is mounted for rotation on a laterally disposed axle 48 that is connected to the frame 1 by a pair of axle hanger brackets 49 and 51. The hanger bracket 51 is bolted, as at 52, to the side of the end frame bar 4 and the other hanger bracket 49 is bolted to the forward portion of the adjacent pendant beam 43. Each of the hanger brackets 39, 40, 49 and 51 are provided with two sets of openings 53 so that the axle hanger brackets may be bolted to the frame 1 either in a high position or in a low position whereby the depth of penetration of the rod weeder shoes 46 may be varied. In the case of the hanger brackets 49 and 51, the two sets of openings 53 are not symmetrical but are arranged, as best shown in Figure 10, so that when adjusting the brackets from one position to the other, the portions that rotatably receive the axle 48 are displaced longitudinally such a distance that, in either position of the hanger brackets, the axis of the axle 48 remains at exactly the same distance from the weeder rod 45. The purpose of this arrangement is to provide for changing the position of the hanger brackets without interfering with or affecting the drive from the wheel 36 that is carried by the axle 48 to the weeder rod 45. The other hanger brackets 39 and 40 have the openings therein formed symmetrically so that when adjusting the axle 38 for an upper position or a lower position, the axle is merely displaced in a vertical plane.

As shown in Figure 1, the left hand wheel 36 constitutes the driving wheel by which the weeder rod 45 is driven. The present invention is particularly concerned with a new and improved form of driving connection between the drive wheel 36 and the weeder rod. Referring first to Figure 2, the axle 48 is extended laterally outwardly beyond the outer axle hanger bracket 51 and receives a wheel box 61 in the form of an elongated tubular member having at its inner end a wheel receiving section 63 on which the wheel 36 is non-rotatably fixed in any suitable manner, as by a nut member 64 screwed onto the threaded inner end of the wheel box. A bevel gear casing or gear box 65 is supported on the outer end of the axle 48 and has an outer side wall 66 formed with a tubular extension 67 which is apertured, as at 68, to receive a pin or bolt 69 by which the casing is secured to the axle 48. The laterally inner wall 71 of the gear box 65 is provided with a tubular section 72 of larger diameter, adapted to fit over a cylindrical section 73 formed on the wheel box 61, there being a flange 74 on the wheel box to prevent inward displacement of the gear box with respect to the wheel box. Axially outwardly of the cylindrical section 73 of the wheel box 61 is a gear receiving section 76 which, in section, is non-circular, having diametrically disposed flattened sections 77 and 78. A set of bevel gears 79 and 80 is disposed within the gear casing 65, the gear 79 including a hub section 82, the interior of which is formed so as to fit the non-circular section 76 of the wheel box 61. The gear 79 is slidable into position on the section 76 and the wheel box has a shoulder 83 up against which the gear is adapted to be disposed, and in this position the gear 79 engages a boss 85 that is formed on the laterally inner wall 71 of the gear caseing. A wheel box collar 87 is disposed about the axial 48 between the outer end of the wheel box 61 and the adjacent outer wall of the gear casing, serving thereby as a spacer to prevent inward displacement of the gear casing with respect to the wheel box. The laterally outer end of the wheel box is provided with a pair of diametrically arranged recesses 91 and 92 in which inwardly directed lugs 93 and 94, formed on the wheel box collar 87, are adapted to engage. The lugs 93 and 94 are flat, and the notches 91 and 92 are formed in a similar manner, whereby the collar 87 is constrained to rotate on the axle 48 with the wheel box. The collar 87 serves as a lock to prevent the gear 79 from being displaced axially of the wheel box in an outward direction with respect thereto, and the engagement of the gear 79 with the laterally inner wall of the gear box or casing 65 prevents any laterally inward displacement of the gear 79 on the wheel box. The axle 48 is prevented from shifting axially in the axle hanger brackets 49 and 51 by means of a plurality of set screw collars 88. The laterally outer main bracket 51 is provided with a dust collar 96 associated therewith in detachable relation. The dust collar 96 comprises a ring-like member 97 secured, as by welding or the like, to a yoke or bracket 98 which is apertured, as at 99, to receive the axle 48. The bracket 98 is spaced from the edge of the ring 97 a distance, as indicated at 100, sufficient to receive the bracket 51 therebetween, as shown in Figure 8.

The gear casing 65 is provided with a rearwardly extending tubular section 105 in which the front end of an intermediate shaft 106 is disposed for rotation. The gear 80, which meshes with the driving bevel gear 79, is fastened to the forward end of the shaft 106 by a key or the like and preferably is held against axial displacement outwardly of the shaft by means of a cotter key 107 or other suitable means. The rear end of the intermediate shaft 106 is received in a tubular section 109 of a rear bevel gear housing 110 which contains a rear set of bevel gears 111 and 112. The gear 111 is fastened by means of a key or the like to the rear end of the intermediate shaft 106 and is held in place by a cotter key 113 or other suitable means whereby axially outward displacement of the gear with respect to the shaft is prevented. The two gear casings 65 and 110 are connected together by a pair of telescopically associated tubes 114 and 115. The forward tube 114 is provided at its forward end with a saw cut or slit 116, this being the portion that engages over the tubular extension 105 of the front gear case 65, and a tube clamp 117 is disposed about the forward end of the tube 114 and acts, when tightened, to firmly secure the tube 114 to the front gear case 65. The forward tube 114 is apertured at 118 so as to accommodate the provision of a lubricant fitting 119 screwed into the tubular portion 105 of the gear case 65 so as to lubricate the bearing at the forward end of the intermediate shaft 106. Preferably, a bearing bushing 121 supports the forward end of the shaft 106 in the gear case 65. The rear end of the intermediate shaft 106 is supported in the rear gear case in a similar manner. The companion telescoping tube 115 is of a diameter to be received within the rear portion of the larger tube 114 and at its rear end is provided with a saw cut or slit 124 and a tube clamp 126 by which the rear end of the smaller telescoping tube 115 may be clamped to the forwardly extending tubular section 109 of the rear gear case 110. The rear end of the tube 115 is provided with an opening 127 to receive a lubricant fitting 128 for lubricating the rear end of the intermediate shaft 106. Also disposed about the smaller telescoping tube 115 is a clamp 131 which is adapted to frictionally engage the tube 115 and to be disposed up against the rear end of the larger tube 114. It will be remembered that the gears 80 and 111 are prevented from being displaced axially outwardly of the intermediate shaft 106, and by providing means to prevent the tubes 114 and 115, which are fixed respectively to the front and rear gear casing 65 and 110, from being forced one inwardly of the other, the two gear casings 65 and 110 are firmly and positively held in position, yet by virtue of the fact that one of the tubes is disposed within the other, the rear gear case 110 may rotate with respect to the other case about the axis of the intermediate shaft 106.

The final drive shaft is indicated in its entirety by the reference numeral 135 and includes a lower section 138 connected by a universal joint 149 to the weeder rod 45 and a short upper section 139 (Figure 9) received by suitable bearing means within a tubular hub or extension 136 on the rear gear case 110. The gear 112 preferably is keyed to the shaft section 139 and held in place by a cotter 137. A washer 146 is welded to the shaft section 139 and bears against the end of the hub 136. The adjacent ends of the shaft sections 138 and 139 are squared, as indicated at 151 and 152, and are loosely received within a square tubular part 153. Rivets 154 extend through enlarged holes in the squared portions 151, 152. By virtue of this construction a slight amount of misalignment of the rear gear case 110 and the end of the weeder rod 45 is accommodated. A round protecting sleeve 156 is disposed about the square sleeve 153 and has a press fit against the corners of the square sleeve 153.

The rear gear casing 110 and its associated parts are supported from the frame 1 by a supporting bracket 140. The latter member is formed or provided with a yoke 141 secured, as by a bolt 142, to the associated frame beam 4. The lower end 143 of the bracket 40 is apertured or otherwise formed to receive means, such as a bolt 144, by which a U-shaped gear box supporting clamp 145 is connected to the supporting bracket 140. The clamp 145 encircles the tubular extension 136 of the gear box 110 and is provided with an elongated slot 147 by which a lubricant fitting 148 is accommodated.

The operation of the implement is as follows:

When a tractor or other source of propelling power is hitched at 31 to the implement, the passage of the machine over the ground rotates the drive wheel 36 which, in turn, drives the intermediate drive shaft 106 through the gears 79 and 80, and the rotation of the intermediate drive shaft 106 drives the final drive shaft 135 through the rear set of bevel gears 111 and 112.

Figure 6:
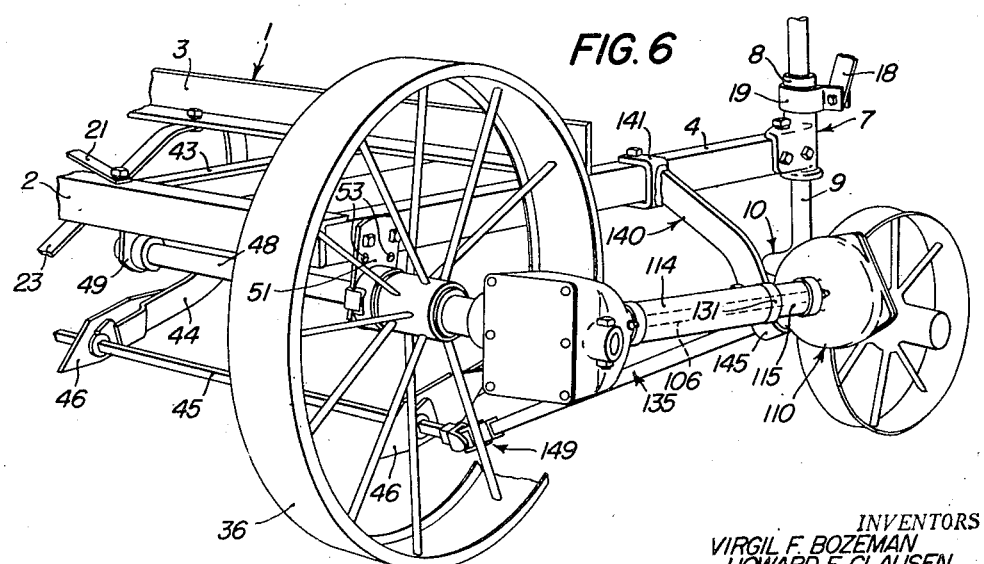

In some cases the machine may be required to have, or the farmer may desire to install, extra clearance beams 244 which will dispose the weeder rod several inches lower with respect to the frame 1, and the drive connections of the present invention are especially constructed to accommodate this change. First, longer idler axle brackets 39 and 40 and longer main axle brackets 249 and 251 are installed in place of the brackets 39, 40, 49 and 51 so as to dispose the axles 38 and 48 an increased distance from the plane of the frame 1, corresponding to the increased vertical dimension of the high clearance beams or pendants 244. After the longer beam pendants are installed and the rod 45 inserted in the weeder rod bearing shoes of the longer pendants, a rear gear case supporting bracket 140a is substituted for the supporting bracket 140 (Figures 5 and 6). However, no change need be made in the driving connections except to substitute a somewhat longer intermediate drive shaft 106a (Figure 5) for the drive shaft 106 (Figures 3 and 6) and to make the necessary readjustment between the tubular sections 114 and 115, as by loosening the clamp 131 and extending the telescoping sleeves 114 and 115 (compare the position of these parts in Figures 5 and 6). With the high clearance pendant beams the driving connections are angled downwardly to a somewhat greater degree, as established by the longer supporting bracket 140a, this new position of the driving connections being accommodated by the swinging of the drive unit as a whole about the axis of the main axle 48 and by the slight amount of rocking required between the rear gear casing 110 and the supporting clamp 145. The slot 147 (Figure 4) is provided so as to accommodate this slight amount of relative rocking movement between the rear gear casing 110 and the bracket clamp 145.

The drive wheel 36 and its axle 48, together with the driving connections to the weeder rod, are shown in Figure 1 at the left side of the machine. However, as shown in Figure 7, these parts may be mounted at the right side of the machine by interchanging the wheels 35 and 36 and their associated parts. In order to effect this interchange, it may be necessary to change the positions of the beams 43 and the end frame members 4 and 5. When making this interchange, the hanger brackets 49 and 51 or 249 and 251 are not turned side for side, and hence when changing the driving connections over to the right side the dust collar assembly 96 is reversed on the hanger bracket 51.

It will be noted that the driving connections from the drive wheel 36 down to the weeder rod are, for all practical purposes, entirely enclosed and there are no low hanging parts to catch trash and the like.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A rod weeder comprising a wheel supported frame, a weeder rod rotatably carried thereby, an intermediate generally longitudinally extending drive shaft, a bevel gear set for driving said shaft from one of said wheels, a second bevel gear set driven from the rear end of said shaft, shaft means actuated by said second bevel gear set for driving said weeder rod, and bracket means carried by the frame and extending generally downwardly therefrom for supporting said second bevel gear set and the outer end of said shaft means.

2. A rod weeder comprising means serving as a frame, supporting wheels therefor adjacent the forward side of the frame, a weeder rod carried by said frame adjacent the rear side thereof, a bevel gear casing supported on one of said wheels and having bevel gears therein, one of which is driven from said wheel, an intermediate shaft supported at its forward end in said bevel gear casing and receiving said other gear of said bevel gear set, a bevel gear casing at the rear of said longitudinally extending shaft, a set of bevel gears in said second casing, a shaft journaled at its upper end for rotation in and supported at its upper end by said second casing and operatively connected at its inner end to rotate said weeder rod, and means rearwardly of said supporting wheels for supporting said second bevel gear casing and the outer end of said shaft from said frame.

3. A rod weeder comprising means serving as a frame, a pair of wheels connected with the forward portion of said frame means, one of said wheels constituting a drive wheel, an axle carried by said frame means and receiving said drive wheel, a bevel gear case supported on said axle, a bevel gear set disposed in said case, one of said gears being connected to said wheel, a generally longitudinally extending shaft having the other bevel gear fixed to the forward end thereof, a second bevel gear case receiving the rear end of said longitudinally extending shaft, a set of bevel gears in said second case, one of said gears being fixed to the rear end of said longitudinally extending shaft, a final drive shaft having its laterally outer end journaled for rotation in said second bevel gear case, tube means fixed to said gear cases, the front end of said tube means being supported through said first gear case by said axle, bracket means connected with said frame and operatively supporting the rear end of said tube means and said second gear case, and a weeder rod carried by said frame means and operatively driven from the laterally inner end of said final drive shaft.

4. A rod weeder as defined in claim 3, further characterized by a pair of brackets receiving said axle, bolt means carried by said frame, and two sets of openings in each of said brackets for receiving said bolt means, said sets of openings being arranged in such relative positions that the axle may be set in either of two different positions relative to the frame with each position substantially the same distance from the weeder rod, whereby the drive from said drive wheel to said weeder rod is unaffected by changing the position of the wheel and axle relative to the frame.

5. A rod weeder comprising a frame, wheel and axle means at each side of the frame adjacent the forward portion thereof, bracket means for connecting said wheel and axle means with said frame, the bracket means at one side of the frame, together with the associated wheel and axle means, being interchangeable with the bracket means and the associated wheel and axle means at the other side, a weeder rod rotatably supported by said frame means, and driving connections between one of said wheels and said weeder rod, including supporting means for carrying a portion of the weight of said driving means from said frame, said supporting means and said driving connections being shiftable with the associated drive wheel to the other side of the frame when said wheel and axle means are interchanged.

6. In a rod weeder having a drive wheel, a relatively stationary axle receiving said wheel with a portion of the axle extending laterally outwardly beyond said wheel, and a weeder rod disposed rearwardly thereof, weeder rod driving means comprising a casing having a wheel-receiving opening at its inner side and an axle-receiving section at its outer side, a generally longitudinally extending intermediate shaft extending rearwardly and downwardly and extending at its forward end into said casing, a bevel gear set disposed within said casing and constructed and arranged for driving said intermediate shaft from said wheel, tube means enclosing said intermediate shaft and secured at its forward end to said casing, and bracket means carried by the frame of said rod weeder for supporting the rear portion of said tube means and acting through the latter to restrain rotation of said casing with said wheel.

7. A rod weeder comprising a generally transversely arranged frame, wheel and axle means interchangeably connected with the ends of said frame, a weeder rod carried by said frame in depending relationship rearwardly of said wheel and axle means, a casing-supporting bracket detachably connected to said frame at one end thereof, one of said wheels constituting the drive wheel for the rod weeder, a casing supported by the axle of said drive wheel, a set of bevel gears disposed in said casing, one fixed to said wheel, an intermediate shaft having its forward end journaled for rotation in said casing and fixed to the other of said bevel gears, a rear bevel gear casing supported by said detachable bracket, said casing receiving the rear end of said intermediate shaft, a set of bevel gears disposed in said rear casing, one being fixed to the rear end of said intermediate shaft, a final drive shaft having its laterally outer end journaled for rotation in said second casing and receiving the other of said second set of bevel gears, and means for connecting the laterally inner end of said final drive shaft with said weeder rod, said drive wheel, shafts, casings, said detachable support being removable from one end of said frame with said drive wheel and adapted to be attached to the other end of said frame whereby the drive for the rod weeder may be disposed either at one end or the other of said frame.

8. In a rod weeder having a drive wheel, frame means, and a weeder rod, rod driving means comprising a first bevel gear casing supported by said wheel, a second bevel gear casing supported by said frame rearwardly of said wheel, an intermediate drive shaft journaled for rotation in said casings, each of the latter having a set of bevel gears therein and one gear of each set being fixed to the ends, respectively, of said intermediate shaft, a final drive shaft having its laterally outer end journaled for rotation in the rear casing, means for connecting the rear casing with the frame and holding the same thereby in either of two different positions, and a pair of telescopically associated tubular sections, one fixed to each of said casings, respectively, and surrounding said intermediate drive shaft, one of said tubular sections being rotatable relative to the other to accommodate a certain amount of rotation of one casing with respect to the other and disposing the rear casing either in one or the other of its positions.

9. In a rod weeder having wheel supported frame means and, optionally, rod-supporting pendants of different lengths so as to dispose the rod in a high or a low position with respect to said frame, driving mechanism for said rod for actuating the latter from one of the supporting wheels, comprising a first gear casing supported axially of said driving wheel, a second gear casing disposed generally rearwardly of said first casing, gearing disposed in said casings, respectively, shaft means connecting said gearing, telescopically associated tubular members connected, respectively, to said casings, and surrounding said shaft means, said tubular members accommodating rotation of one casing with respect to the other about the axis of said shaft means, a final drive shaft carried by the rear casing and connected with said weeder rod, said final drive shaft moving with said rear casing about the axis of said shaft means when the rear casing is turned in one direction or the other to accommodate the high or low disposition, relative to the weeder frame, of said weeder rod, and bracket means for supporting the rear casing and the associated ends of said shaft means and final drive shaft from said rod weeder frame.

10. The invention set forth in claim 9, further characterized by said first casing, together with the associated shaft means, rear casing, tubular members and final drive shaft being swingable in a generally vertical direction about the axis of said drive wheel, and means for supporting the rear casing and associated parts from said frame rearwardly of the drive wheel in either an upper or a lower position with respect thereto.

11. Driving mechanism for an agricultural implement or the like having a rotatable driving part, comprising a first gear casing mounted for swinging movement about the axis of said driving part, a pair of bevel gears therein, one of said gears being connected to be driven by said driving part, a driving shaft having one end journaled for rotation in said casing and connected with the other gear therein, said last mentioned gear engaging said casing and connected with said shaft whereby axial displacement of the latter relative to the casing in an outward direction is restrained, a second gear casing in which the other end of said shaft is journaled for rotation, a pair of bevel gears disposed in said second gear casing, means connecting one of said last mentioned gears with said other end of said shaft, said last mentioned gear engaging said second mentioned casing so as to prevent movement of the latter relative to said shaft in said one direction, a pair of telescopically associated tubular members connected, respectively, with said casings, means connecting said tubular members so as to prevent movement of said casings toward one another, and driven means driven from the other gear in said second casing.

12. The invention set forth in claim 11, further characterized by the means connecting said tubular members accommodating rotation of one of said casings with respect to the other about the axis of said shaft.

13. Driving means for an agricultural implement or the like having a relatively stationary axle and a drive wheel rotatable thereon, said driving means comprising a casing fixed to the end of said axle and having an inner bearing portion receiving a portion of said wheel, a gear in said casing non-rotatably mounted on said wheel portion and bearing axially against the adjacent part of said bearing portion, said wheel portion having a shoulder receiving said gear, and means disposed within said casing for holding said gear in position with respect to said wheel portion and engaging the wall of said casing opposite said bearing portion for preventing axial displacement of said wheel portion with respect to said casing.

14. Driving means for an agricultural implement or the like having a relatively stationary axle and a drive wheel rotatable thereon, said driving means comprising a wheel box rotatably mounted on said axle, a gear casing connected to the outer end of said axle and receiving the outer end of said wheel box, said wheel being secured to said wheel box inwardly of said casing, a gear disposed within said casing in non-rotatable relation with respect to the end of the wheel box within said casing, means for holding said gear on said wheel box and against one side of said casing, and means acting against the other side of said casing for preventing axial displacement of said gear within said casing toward said other side thereof.

15. Driving means for an agricultural implement or the like having a relatively stationary axle and a drive wheel rotatable thereon, said driving means comprising a wheel box rotatably mounted on said axle, a gear casing connected to the outer end of said axle and receiving the outer end of said wheel box, said wheel being secured to said wheel box inwardly of said casing, a gear disposed within said casing in non-rotatable relation with respect to the end of the wheel box within said casing, and a collar disposed about said axle at the outer end of said wheel hub and non-rotatably engaging the latter for holding the gear in position thereon, said collar serving to prevent laterally inward displacement of said casing toward said gear.

16. The invention set forth in claim 15, further characterized by the outer end of said wheel box having a pair of diametrically opposed flattened lugs and said collar having a pair of lug-engaging sections and disposed about said axle at the outer end of said wheel box with the laterally outer face of said collar disposed against the laterally outer wall of said casing.

17. A rod weeder comprising a generally transversely disposed frame, a transversely disposed weeder rod rotatably carried thereby, a supporting wheel at each end of the frame one of said wheels constituting a drive wheel, means for mounting said wheels interchangeably at the ends of said frame, whereby to dispose said driving wheel optionally at one side or the other of the weeder, means for supporting said weeder rod on said frame in two optional positions with the end thereof adjacent the drive wheel spaced inwardly from the end of said frame, and an enclosed bevel gear drive for driving said rod from said drive wheel, comprising a unit including a generally longitudinally extending shaft and a laterally inwardly extending shaft, the inner end of which is adapted to be connected with the inwardly disposed end of said rod, means for optionally supporting said drive unit at either end of said frame, and means for connecting the drive unit to said drive wheel in either position of the latter.

18. The invention set forth in claim 17, further characterized by a drive axle receiving said drive wheel and disposable with the latter at either end of said frame means for mounting the forward part of said drive unit on the outer end of said drive axle, and means accommodating relative movement between forward and rearward parts of said drive unit to provide for disposing the laterally inwardly extending shaft inwardly toward the weeder rod in either position of said drive unit.

19. Driving means for an agricultural implement or the like having a relatively stationary axle and a drive wheel rotatable thereon, said driving means comprising a casing fixed to the end of said axle and enclosing a portion of said wheel, a bevel gear set in said casing and including a gear disposed against one side wall of the casing, means for locking said wheel portion to said gear so that the latter acts to prevent relative axial movement between the casing and wheel portion in one direction, and means acting against the opposite side wall and said wheel portion for preventing relative axial movement between the casing and wheel portion in the opposite direction.

20. In a rod weeder having a drive wheel, frame means, and a weeder rod, rod driving means comprising a first gear casing supported by said wheel, a second gear casing supported by said frame rearwardly of said wheel, an intermediate drive shaft journaled for rotation in said casings, each of the latter having a set of gears therein and one gear of each set being fixed to the ends, respectively, of said intermediate shaft, a final drive shaft having its laterally outer end journaled for rotation in the rear casing, a pair of telescopically associated tubular sections, one fixed to each of said casings, respectively, and surrounding said intermediate drive shaft, one of said tubular sections being rotatable relative to the other to accommodate a certain amount of rotation of one casing with respect to the other and disposing the rear casing in different positions relative to said first casing, and means adjustably connected with said second casing for supporting the latter from said frame means in different positions.

21. In a rod weeder having a drive wheel, frame means, and a weeder rod, rod driving means comprising a first gear casing supported by said wheel, a second gear casing supported by said frame rearwardly of said wheel, an intermediate drive shaft journaled for rotation in said casings, each of the latter having a set of gears therein and one gear of each set being fixed to the ends, respectively, of said intermediate shaft, a final drive shaft having its laterally outer end journaled for rotation in the rear casing, said casings being arranged for relative rotation one with respect to the other, and means adjustably connected with said second casing for supporting the latter from said frame means in different positions.

VIRGIL F. BOZEMAN.
HOWARD F. CLAUSEN.

REFERENCES CITED

The following references are of record in the file of this patent:

UNITED STATES PATENTS

| Number | Name | Date |
| --- | --- | --- |
| 523,266 | Cochran | July 17, 1894 |
| 1,051,619 | Mustin | Jan. 28, 1913 |
| 1,316,625 | Lumm | Sept. 23, 1919 |
| 1,614,356 | Foot | Jan. 11, 1927 |
| 1,718,503 | Van Patten | June 25, 1929 |
| 2,176,541 | Morris | Oct. 17, 1939 |
| 2,322,328 | Tuft | June 22, 1943 |